United States Patent
Hutt et al.

[11] Patent Number: 5,864,356
[45] Date of Patent: Jan. 26, 1999

[54] LASER DYE THERMAL TRANSFER PRINTING

[75] Inventors: Kenneth West Hutt, Essex; Richard Anthony Hann, Suffolk; Ha Cong Viet Tran, Essex, all of Great Britain

[73] Assignee: Imperial Chemical Industries PLC, London, England

[21] Appl. No.: 617,799

[22] PCT Filed: Sep. 12, 1994

[86] PCT No.: PCT/GB94/01986

§ 371 Date: Jun. 10, 1996

§ 102(e) Date: Jun. 10, 1996

[87] PCT Pub. No.: WO95/07514

PCT Pub. Date: Mar. 16, 1995

[30] Foreign Application Priority Data

Sep. 10, 1993 [GB] United Kingdom ............ 9318805

[51] Int. Cl.$^6$ .............................. B41J 2/47; G01D 15/14
[52] U.S. Cl. .......................................... 347/251; 347/252
[58] Field of Search ....................................... 347/250, 235, 347/248, 249, 262, 264, 251, 252

[56] References Cited

U.S. PATENT DOCUMENTS

| | | | |
|---|---|---|---|
| 4,383,262 | 5/1983 | Noguchi ........................ | 347/225 |
| 4,772,582 | 9/1988 | DeBoer ......................... | 503/227 |
| 4,903,042 | 2/1990 | Kaufl et al. .................... | 347/232 |
| 5,036,040 | 7/1991 | Chapman et al. ............... | 503/227 |
| 5,066,962 | 11/1991 | Sarraf ........................... | 347/237 |
| 5,241,328 | 8/1993 | Sarraf et al. ................... | 347/232 |

FOREIGN PATENT DOCUMENTS

| | | | |
|---|---|---|---|
| 0321923 | 6/1989 | European Pat. Off. ......... | B41M 5/26 |
| 0533592A2 | 3/1993 | European Pat. Off. ....... | G06K 15/12 |
| 2083726 | 3/1982 | United Kingdom ............. | H04N 1/22 |
| WO91/08905 | 6/1991 | WIPO ................................ | B41J 2/52 |

*Primary Examiner*—N. Le
*Assistant Examiner*—L. Anderson
*Attorney, Agent, or Firm*—Testa, Hurwitz & Thibeault, LLP

[57] ABSTRACT

A scanning laser beam heats selected regions of a dye donor ribbon to transfer dye to a receiver sheet to form an image therein. The beam scan rate and delay time between the start of successive pulses is set so that adjacent heated pixel regions overlap and so that a significant amount of residual heat from a first printed pixel is still present when heat is applied to the next adjacent pixel. The use of this residual heat improves the printing efficiency. An elliptical beam may have its major axis in the scan direction to facilitate overlap. Printing may be effected to a non-square grid with more information, or a repetition of information, a set number of times in the scan direction. The power applied to a pixel may be adjusted depending on the darkness of previous adjacent printed pixels.

15 Claims, 2 Drawing Sheets

LASER DYE THERMAL TRANSFER PRINTING

BACKGROUND OF THE INVENTION

The present invention relates to a method of operating a laser source to effect dye thermal transfer printing. There are three main types of dye thermal transfer printing methods, in which dye is transferred by melting, diffusion and sublimation respectively.

In the diffusion method, a dye donor ribbon and a dye receiver ribbon, comprising a dye layer and a receiver layer, respectively, on a supporting substrate, are held in contact with one another, and a localized source of energy is used to heat selected pixel regions of the dye layer to cause dye in those regions to become thermally mobile and diffuse into the adjacent receiver layer to produce a pattern of printed pixels therein. A desired print may be produced by heating an appropriate selection of pixel regions in the dye layer. By applying more or less energy to a pixel region of the dye layer, more or less dye is transferred to the receiver layer, and so darker or lighter printed pixels are produced. This allows for continuous tone printing.

Laser sources are often selected as the energy source, because they can provide an intense, highly directional and controllable output. When laser sources are selected, laser light absorbing material is normally provided in the dye ribbon, either as a separate layer or dispersed within the dye layer, to convert the laser energy to heat.

Typically, the output of a laser source is scanned across the donor ribbon at a set speed, and the laser source output is pulsed on and off. A heated pixel region is produced in the dye layer whenever the output is pulsed on, and the darkness of a printed pixel depends upon the amount of dye transferred to it from the corresponding heated pixel region in the dye layer, which in turn, depends upon the power and length of the laser pulse applied to that pixel region. The spacing between adjacent printed pixels depends upon the scan rate of the laser output across the dye layer and on the time between the start of the pulses producing the printed pixels.

A region of darkness may be produced in a print by printing a line of adjacent dark pixels, and it is known to select the scan rate and laser pulse rate so that each printed pixel partly overlaps those adjacent it in the scan direction. This ensures that the printed dark region is of constant optical density, and compensates for the fact that each printed pixel is slightly darker at its centre than at its periphery due to the gaussian cross-sectional profile of a typical laser output. The overlap generally coincides with the half width points of the laser beam profile (measured at l/e of maximum profile intensity) when projected onto the printed pixels.

SUMMARY OF THE INVENTION

The present invention relates to the more efficient operation of a laser source in dye thermal transfer printing, and recognizes the advantages of optimized modulation and control of laser pulse times and overlap, in contrast to the prior art, which does not.

From a first aspect, the invention provides a method of laser dye thermal transfer printing in which the output of a pulsed laser source is scanned across a dye donor element to heat selected pixel regions of the donor element to effect transfer of dye to a dye receiving element, wherein the scan rate of the output across the donor element and the delay time between the start of successive laser pulses which apply heat to respective adjacent heated pixel regions are set such that the adjacent heated pixel regions overlap in the scan direction, and wherein the delay time is further set such that a significant amount of residual heat from a first heated pixel region, which produces a printed pixel of the darkest shade, is still present in that region at the time of application of heat to the adjacent heated pixel region.

The term "adjacent heated pixel regions" should be taken to define a pair of heated pixel regions which are at the minimum spacing for the particular scan rate and delay time used in the method, and should not be taken to cover two heated regions what are produced one after the other but are separated by one or more pixel region widths, e.g. when printing an image having a dark pixel then a white region and then another dark pixel. In this latter case there could be no overlap or thermal interaction between the dark pixel regions.

The present invention provides a more efficient way of printing as compared with the prior art.

In accordance with the present invention, at least where a first pixel region is printed at the darkest shade by a full power pulse, there is still a significant amount of heat in that pixel region when an adjacent overlapping region is heated. Thus, rather than being wasted, this residual heat is utilised to enhance the heating effect in the adjacent pixel region.

The present invention provides a thermal interaction between adjacent heated pixel regions, at least where one is heated by the maximum laser output, and so enables the energy applied by a laser source to be used more efficiently, so that a print area of a set optical density can be produced from a lower laser energy, as compared with the prior art.

The time delay is preferably set such that a thermal interaction exists even when the first pixel region is heated to less than the maximum extent, i.e. to produce a pixel of intermediate shade. As discussed above, where there is a lightly colored pixel or pixels, or an unprinted region, there will be no significant thermal interaction at all. In the presently preferred system, it is estimated that significant thermal interaction is obtained from a first pixel region printed to about 30%, of the maximum optical density.

It is preferred for the delay time to be about 1,000 microseconds or less, as the invention has been found to work particularly well with the delay time below or at about this value.

It is further preferred for the delay time to be less than or equal to about 10 microseconds, and, indeed it is preferred for the delay time to be minimized, and to tend to zero. The preferred scan rate is from about 0.1 m/s to about 100 m/s and the preferred laser power density is from about $10^7$ to $10^{10}$ Wm$^{-2}$.

It is also preferred for adjacent heated pixel regions to overlap by an amount greater than the laser cross-sectional profile half width point overlap used in the prior art and preferably to overlap by an amount about 10% or more greater than the prior art overlap. By having a greater overlap, more residual heat from an adjacent heated pixel region will be available, thus increasing efficiency still further. The scan speed of the laser output may therefore be set relative to the heating delay time to allow for a more substantial overlap of adjacent heated pixel regions than is known in the prior art. The greater the overlap, the greater the interaction.

Having the pixel regions closer together implies that more pixels need to be printed in the present method than in the prior art methods to print a dark area of a given size. This might be thought to be a disadvantage in terms of energy efficiency, but it has been found that the energy saving produced by the thermal interaction of the pixels more than compensates for the need to print more pixels.

A laser source may be operated in the pulsed mode to print a region of constant optical density by successively pulsing the laser source on and off to produce a line of overlapping pixels. Of course, to produce a desired print image, areas of different optical densities are needed, and so the laser energy applied to different pixel regions needs to be modulated. This may be achieved by varying the power or length of the laser pulse.

The laser source could be operated in a continuous mode instead of a pulsed mode, in which case a line of constant optical density may be produced by scanning a continuous beam across the dye layer. This continuous scanning corresponds to the limit of decreasing both the heating delay time and the pixel spacing to a minimum in effect to zero. However, modulation is required to print information, e.g. images, and continuous scanning alone will not provide this.

Thus, viewed from another aspect, the present invention provides a method of laser dye thermal transfer printing, in which the output of a laser source is scanned across a dye donor element to effect transfer of dye to a dye receiving element, wherein the laser source is continuously on when producing regions of darkest shade, and wherein the beam is modulated to produce regions of lighter shade. This modulation may be achieved by varying the power of the beam and/or by rapidly modulating the laser source on and off, as it is scanned across the pixel regions producing the lighter shades, so that heating takes place only for a desired fraction of the time taken for the beam to cross these pixel regions. Preferred scan rates are 0.1 to 100 $ms^{-1}$.

Any suitable laser source may be used, such as an Nd:YAG laser or a laser diode, which can be operated in either the pulsed or continuous mode.

Although the invention provides thermal interaction in the scan direction, the time between the printing of successive scan lines will be much greater than the time for each heated pixel region to cool fully. Therefore, no thermal interaction exists between heated pixel regions of, for example, a dye sheet which are adjacent one another in the feed direction of the dye sheet, perpendicular to the scan direction. As there is no thermal interaction, there is no advantage in having an overlap between adjacent heated pixel regions in the feed direction which is greater than that known from the prior art, and so the pixel regions in the scan direction will generally be closer to one another than in the feed direction. Accordingly, a pulsed laser will generally print information as a non-square pixel data grid, with more pixel information being provided in the scan direction than the feed direction. Therefore, to produce an image with data distribution in a square grid, i.e. to provide equal resolution in both the scan and feed directions, data in the scan direction could be printed repeatedly n times, where nx=y, x being the pixel spacing in the scan direction and y the spacing in the feed direction.

Thus, the invention extends to a method of laser dye thermal transfer printing in which printing is effected to a non-square grid, with more pixel information being provided in the laser scan direction than a direction perpendicular thereto. The laser addressed locations may form a rectangular grid, and a square aspect ratio may be provided by repeatedly printing each piece of data information a set number of times in the laser scan direction.

Also, if a laser source is arranged to produce, for example, an elongate, e.g. elliptical, scanning spot, then it is preferred for the spot to be arranged with its long axis in the scan direction. This allows for a greater overlap between adjacent heated pixel regions, and also allows a square data grid to be used for the print information. This may be particularly applicable to the use of laser diodes where the uncorrected beam is elliptical.

Thus, the invention also extends to a method of laser dye thermal transfer printing, in which the laser spot scanning across the dye donor element is elongate, e.g. elliptical, in cross-section, and in which the long axis of the spot is arranged to lie in the direction of laser scan. Preferably, data is printed to the donor element using a square grid.

In a preferred embodiment, the amount of heat applied to a pixel region to produce a printed pixel of a set tone is varied in dependence on the tone of one or more consecutively adjacent previously printed pixels in the scan line. This takes into account the fact that the amount of dye transferred depends not only upon the heat applied directly to a pixel region but also upon the amount of residual heat in adjacent pixel regions. Thus, any residual heat from one or more adjacent heated pixel regions, and the heat applied directly to a pixel region, together, set the darkness of a printed pixel, and, by making corrections for the variations in the residual heat available, undesired tonal features are avoided in the finished print. This may be most noticeable when an image has a sharp transition in shade, e.g. a dark edge, where the thermal interaction may result in a gradual transition of shade, i.e. a blurred edge. By compensating for the heat applied to a pixel region in dependence on the thermal history of the donor element, this blurring may be avoided.

For example, the energy applied to a pixel region may be increased, if one or more of the previously printed adjacent pixels is lighter in tone than the pixel to be printed, and the amount of increase may depend on the difference in tone of the previously printed pixels.

Thus, if a few pixels in a scan line are white and the next four are black and of the same optical density, then the heated pixel region producing the first black pixel should receive more energy than the pixel region producing the second black pixel, which, in turn, should receive more energy than the regions producing the third and fourth black pixels. These third and fourth regions may be heated with a basic uncompensated energy based on the desired tone. The first compensated region may have a 100 percent increase in the basic energy, the second heated region may have a 50 percent increase.

The feature of residual heat compensation is, in itself, significant and, viewed from a further aspect, the present invention provides a method of laser dye thermal transfer printing in which the output of a laser source is scanned across a dye donor element to heat selected pixel regions of the donor element to effect transfer of dye to a dye receiving element to produce printed pixels of varying shade therein, wherein the energy applied to a pixel region of the donor element to produce a printed pixel of a set shade is varied in dependence on the shade of one or more previously printed successively adjacent pixels in the scan line.

A microprocessor may be used to control the printing apparatus and effect the above printing methods.

BRIEF DESCRIPTION OF DRAWINGS

Embodiments of the present invention will now be described, by way of example only, with reference to the accompanying drawings, in which.

DETAILED DESCRIPTION

Figure 1:
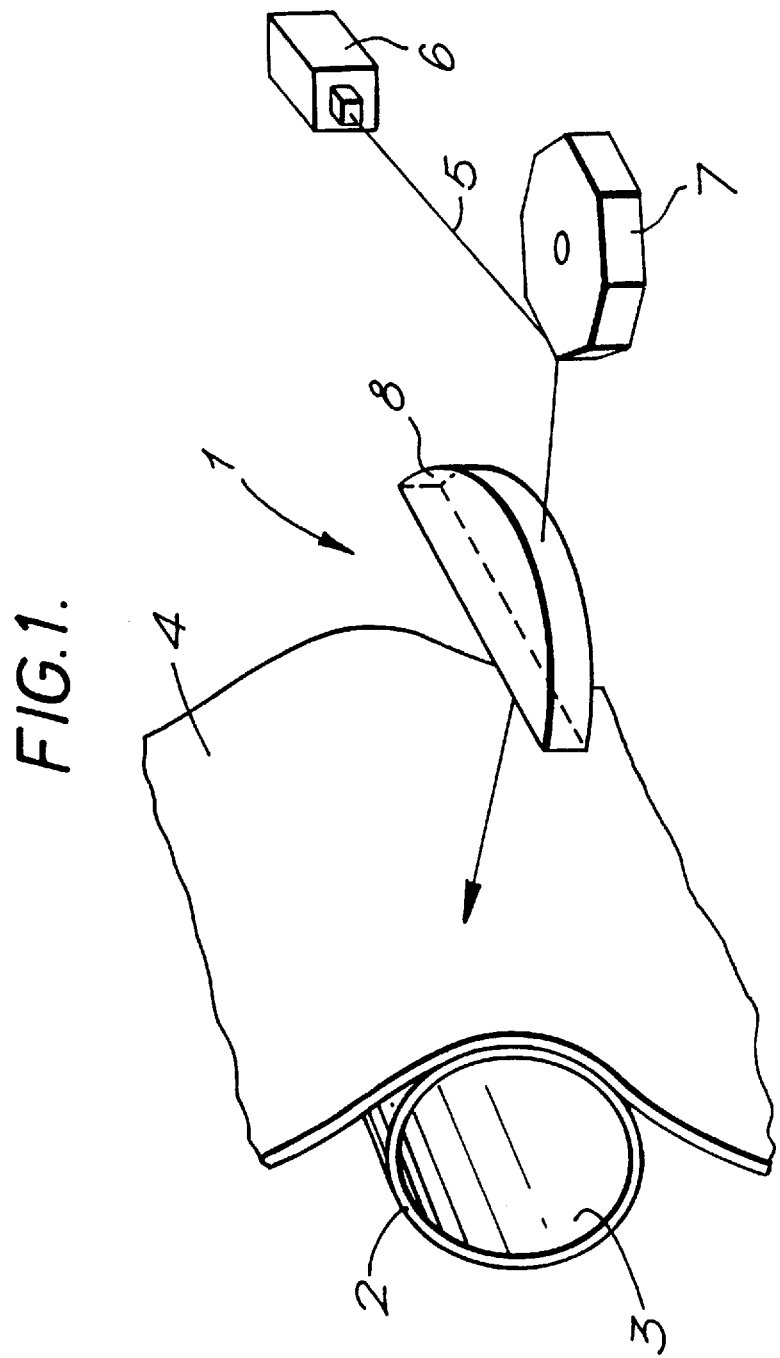
FIG. 1 is a schematic view of a printing system operable in accordance with embodiments of the present invention.

Referring to FIG. 1, a printing system 1 comprises a dye receiver sheet 2 mounted on a rotating drum 3, and a dye donor ribbon 4 held in tension against the receiver sheet 2 by, for example, a pair of tensioning rollers (not shown). The output 5 from a laser source 6 is scanned across the dye ribbon 4 by a rotating polygon mirror 7. A flat field lens 8 is provided between the polygon 7 and dye ribbon 4 to modify the laser output 5 to scan in a flat focal plane rather than a curved one.

In one embodiment, the laser source 6 is modulated to produce an output 5 which is pulsed on and off. As the output 5 is scanned across the donor ribbon 4, selected pixel regions are heated by pulsing on the laser output 5 at selected points in the scan. Dye transfers from these heated regions to the receiver layer to produce corresponding printed pixels therein. Thus, a print image is produced pixel-line-by-pixel-line, as the drum 3 holding the receiver sheet 2 rotates in synchronism with movement of the dye donor ribbon 4.

Figure 2:
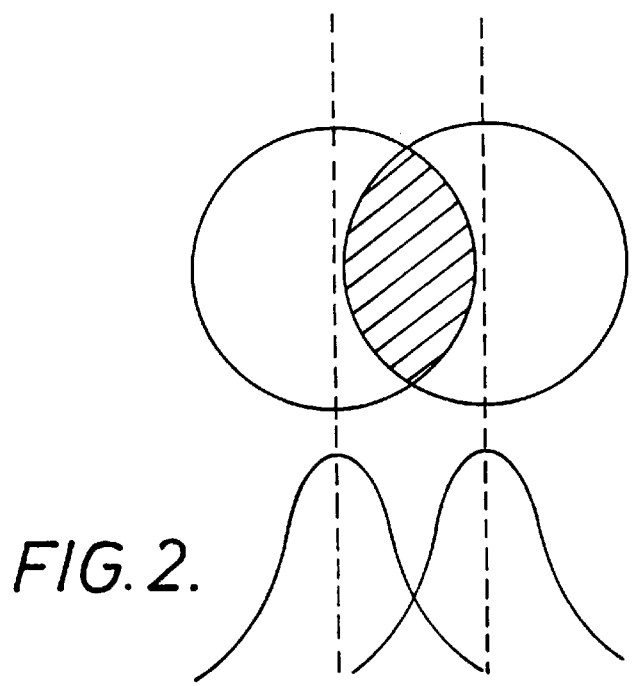
FIG. 2 is a schematic diagram showing the overlap of a pair of adjacent pixel regions in a dye ribbon.

In accordance with a first embodiment of the present invention, when producing a region of constant high optical density, the time between the start of successive output pulses from the laser source 5 is less than 1000 $\mu$s, and the scan rate is set in dependence on this pulse rate and the laser beam width to ensure that adjacent heated pixel regions of the dye ribbon overlap one another by an amount greater than that corresponding to the overlap at the half-width points of the laser output 5 cross-sectional profile. This is illustrated in FIG. 2. As an example, the time between pulses could be 5 $\mu$s, the beam width could be 20 $\mu$m, and the scan speed could be 1 ms$^{-1}$.

A microprocessor may be used to control the operation of the apparatus.

By using a pulse time of less than 1000 $\mu$s, a thermal interaction is produced between adjacent heated pixel regions, so that residual heat remaining after a pixel region is heated is utilised in the subsequent heating of an adjacent pixel region. This reduces the energy required to produce a set optical density, as compared with the prior art. By having a large pixel overlap, this thermal interaction is increased.

As there is this thermal interaction, the energy applied to a pixel region of the donor ribbon 4, to produce a pixel in the receiver sheet 2 of a certain dye density, is modified to take account of the thermal history of the donor ribbon. This is because the residual heat from the printing of one or more previously printed pixels together with a basic amount of heat directly applied to a pixel region for producing a set pixel tone, make the shade of the printed pixel darker than the set tone, and uncompensated variations due to the variation in the residual heat contribution can produce undesirable print results. This may be most noticeable when a printed image makes a sharp transition in shade, e.g. has a dark edge, as the thermal interaction results in the gradual transition of shade, i.e. a blurred edge.

To prevent this, the energy applied to a heated pixel region to print a pixel of a set tone is corrected to take account of any residual heat contribution from the printing of a previous few adjacent pixels in the scan line. This compensation depends on the contrast of the grey levels of, for example, the previous three consecutive adjacent pixels, so that if the first few pixels in a scan line are white and the next four are black and of the same optical density, then the heated pixel region producing the first black pixel must receive more thermal energy than the second, which, in turn requires more thermal energy than the third and fourth of the heated pixel regions forming the black pixels. The third and fourth pixel regions can be heated with their normal uncorrected thermal energy.

The amount of energy correction may be about 100 percent of the uncorrected thermal energy for the first pixel, and about 50 percent for the second pixel.

Instead of pulsing the laser output 5, the output 5 could comprise a continuous beam, which, when printing a region of high optical density, corresponds to the limit of a zero heating delay time and a complete overlap and merging of the separate pixel regions. In order to produce regions of varying optical density, the laser output power may be modulated, or may be rapidly pulsed on and off, so that the output 6 is on only for a desired fraction of the time taken for the beam to cross that region.

An experiment was conducted to illustrate the advantages of reduced delay time between pulses:

Dye sheets were prepared by gravure coating 23 $\mu$m S grade Melinex (ICI) with the following solutions to give cyan dye coat. The solution was coated to give a dry coat weight of approximately 1 $\mu$m.

| Cyan | |
|---|---|
| C1 | 0.865 kg |
| C2 | 1.298 kg |
| EC200 | 1.622 kg |
| EC10 | 0.541 kg |
| IRA | 0.571 kg |
| THF | 50 liters |

The following abbreviations for the dyes and binders, are used:

| C1 | 3-acetylamino-4-(3-cyano-5-phenylazothiophenyl-2-ylazo)-N,N-diethyaniline |
|---|---|
| C2 | C1 solvent blue 63 |
| PVB | Poly vinyl butyral BX1 from Sekisui |
| ECT | Ethyl Cellulose T10 from Hercules |
| S101743 | Hexadeca-b-thionaphthalene Copper (II) phthalocyanine |

Receiver sheets were prepared by coating, via the bead method, 125 $\mu$m O grade melinex (ICI) with the following formulation from a solution in a 50/50 mixture of toluene and MEK to give a dry coat weight of 3–4 $\mu$m:

| Vylon 200 | 30 parts | cymel 303 | 6 parts |
|---|---|---|---|
| Vylon 103 | 70 parts | Tegomer HSi2210 | 0.7 parts |
| Ketjenflex MH | 7.5 parts | Tinuvin 900 | 1 part |
| R4046 | 0.4 parts | | |

Vylon 200 and 203 are soluble polyesters with high dye affinity, from Toyobo. Tinuvin 900 is a UV absorber from Ciba Giegy. Ketjenflex MH is a crosslinking agent from Akzo. Cymel 303 is a hexamethyoxymethylmelamine oligomeric crosslinking agent from American Cyanamid. Tegomer HSi2210 is a bis-hydroxy alkylpolydimethylsiloxane releasing agent from TH Goldschmidt and R4046 is an amine blocked para toluene sulphonic acid catalyst.

The dye sheet/receiver sheet assembly was supported by a platen and brought into contact by tensioning the dye sheet against the platen. The tension on the dye sheet was just enough to provide the intimate contact between the dye sheet and the receiver sheet necessary for dye transfer. The laser used was a Spectra Diode Lab 150 mW semiconductor laser operating at 820 nm wavelength. The laser power delivered to the dye sheet/receiver sheet assembly was about 100 mW and the beam spot size was about 38 μm. The scanner was a General Scanning galvanometer scanner having a 80 Hz bandwidth.

The laser on time and pixel spacings were kept constant at about 50 s and 20×20 μm, respectively. The delay time between pulses was then varied (as was the scan speed to keep the pixel spacing constant), and the corresponding optical density of a uniform printed block was then measured using a Sakura densitometer.

Figure 3:
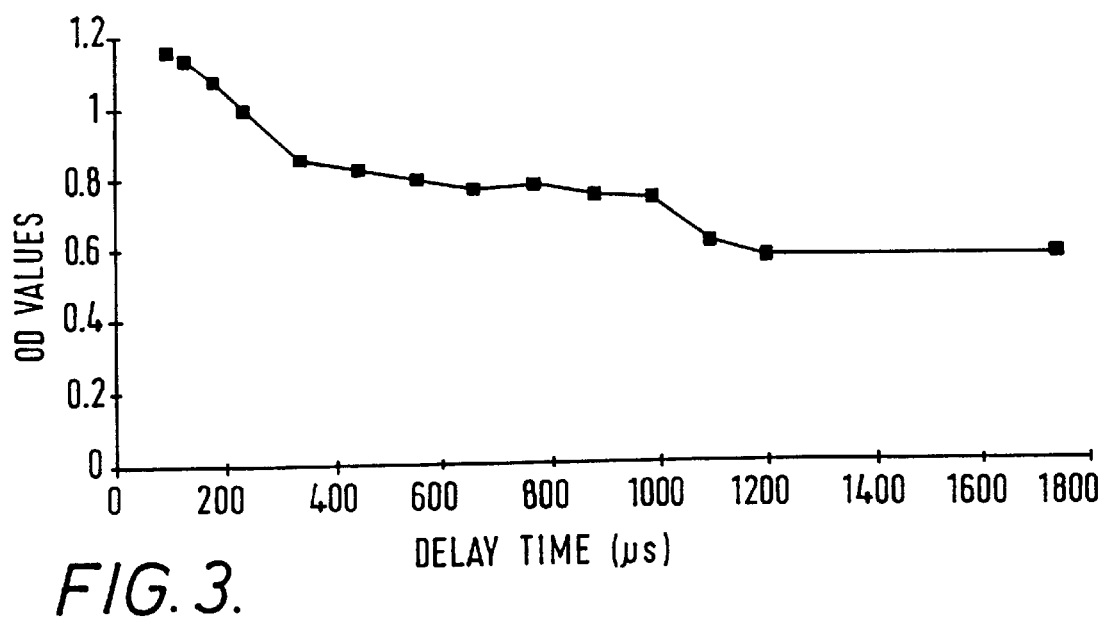
FIG. 3 is a graph of pulse delay time against optical density.

The results are indicated in FIG. 3, and shows that as the thermal interaction increases, the energy efficiency increases. The main increase is at about 1000 μs.

We claim:

1. A method of laser dye thermal transfer printing, comprising the steps of:
   (a) providing a modulated laser source;
   (b) selecting a scan rate and a delay time between starting points of successive laser pulses of a modulated laser output; and
   (c) scanning the modulated laser output across a dye donor element, thereby sequentially heating a plurality of selected pixel regions of the dye donor element and transferring a dye from the dye donor element to a receiver element disposed adjacent the dye donor element,
   wherein the scan rate and the delay time are selected to create adjacent heated pixel regions which overlap in a scan direction and by an amount greater than an overlap at half-width points of a laser output cross-sectional profile.

2. The method of claim 1, wherein step (b) comprises selecting the delay time of about 1,000 microseconds or less.

3. The method of claim 1, wherein step (b) comprises selecting the delay time of about 10 microseconds or less.

4. The method of claim 1, wherein step (b) comprises selecting the scan rate from about 0.1 m/s to about 100 m/s.

5. The method of claim 1 further comprising the step of selecting a laser power density from about $10^7$ to $10^{10}$ Wm$^{-2}$.

6. The method of claim 1, wherein step (c) comprises scanning the modulated laser output so as to print data in the scan direction repeatedly n times, where nx=y, x is a pixel spacing in the scan direction and y is a spacing in a direction perpendicular to the scan direction.

7. The method of claim 1, wherein step (c) comprises scanning the modulated laser output across a dye donor element with an elongate scanning spot having a long axis in the scan direction.

8. The method of claim 1 further comprising the step of selecting an amount of heat applied to a pixel region to produce a printed pixel of a set tone based on a tone of one or more previously printed adjacent pixel regions.

9. The method of claim 8, wherein the step of selecting an amount of heat comprises increasing the amount of heat applied to a pixel region if one or more of the previously printed adjacent pixel regions is lighter in tone than the pixel region to be printed.

10. The method of claim 9, wherein the step of increasing the amount of heat comprises increasing the heat by an amount based on a difference in tone of the previously printed pixel regions and the pixel region to be printed.

11. The method of claim 1, wherein step (b) comprises selecting the scan rate and the delay time which create an overlap of 10% or more greater than the overlap at half-width points of a laser output cross-sectional profile.

12. The method of claim 1, further comprising the step of providing a laser source which is continuously on when producing a plurality of regions of a darker shade on the receiver element, and providing a laser source that is modulated when producing a plurality of regions of a lighter shade on the receiver element.

13. The method of claim 1, wherein step (c) comprises scanning the modulated laser output so as to provide more pixel information per unit length in the scan direction than in a direction perpendicular to the scan direction.

14. The method of claim 13, wherein each piece of pixel information is repeatedly printed a set number of times in the scan direction.

15. A method of laser dye thermal transfer printing, comprising the steps of:
   (a) providing a laser source to generate a laser output;
   (b) selecting an energy level for the laser output to create a desired tone on a receiver element; and
   (c) scanning the laser output across a dye donor element, thereby sequentially heating a plurality of selected pixel regions of the dye donor element, transferring a dye from the dye donor element to the receiver element, and providing printed pixel regions with a varying shade on the receiver element;
   wherein the energy level is selected based on a tone of one or more previously printed adjacent pixel regions.

* * * * *